United States Patent
Altenrath et al.

(10) Patent No.: US 6,431,613 B1
(45) Date of Patent: Aug. 13, 2002

(54) PIPE CONNECTION WITH A CONNECTING PORTION FORMED ONTO THE PIPE

(75) Inventors: Jörg Altenrath; Michael Hahn, both of Lohmar; Alfons Schorn-Gilson, Swisttal, all of (DE)

(73) Assignee: Walterscheid Rohrverbindungstechnik GmbH (DE)

( * ) Notice: Subject to any disclaimer, the term of this patent is extended or adjusted under 35 U.S.C. 154(b) by 0 days.

(21) Appl. No.: 09/692,572

(22) Filed: Oct. 19, 2000

(30) Foreign Application Priority Data

Oct. 26, 1999 (DE) .......................... 199 51 460

(51) Int. Cl.$^7$ ............................. F16L 19/028
(52) U.S. Cl. .................. 285/354; 285/334.4; 285/334.5
(58) Field of Search ............... 285/354, 334.4, 285/334.5; F16L 19/028

(56) References Cited

U.S. PATENT DOCUMENTS

| | | | | |
|---|---|---|---|---|
| 1,804,814 A | * | 5/1931 | Schultis | 285/334.5 |
| 2,463,883 A | * | 3/1949 | Kinsey | 285/334.5 |
| 5,893,591 A | * | 4/1999 | Ebel et al. | 285/334.5 |
| 6,168,711 B1 | * | 1/2001 | Schorn-Gilson | 285/334.5 |

FOREIGN PATENT DOCUMENTS

| | | |
|---|---|---|
| DE | 195 11 063 | 11/1995 |
| DE | 195 20 099 | 1/1997 |

* cited by examiner

Primary Examiner—Lynne H. Browne
Assistant Examiner—Aaron Dunwoody
(74) Attorney, Agent, or Firm—Harness, Dickey & Pierce, P.L.C.

(57) ABSTRACT

A pipe connection has a connecting member (1). The connecting member (1) has a first end face (4), a first conical bore (5), starting to taper from the latter, which defines a first cone angle (11). The connecting member also includes an axial bore length (9) followed by a bore (6). The outside of the connecting member (1) has a threaded portion (3). A nut (13) has a second conical bore (15) tapered in the direction opposite to the direction of the first conical bore (5). The second conical bore defines a second cone angle (16). A through-bore (17) is in the nut (13). A pipe (18) has a pipe projection (19) which extends into the bore (6) of the connecting member (1). A connecting portion (21) is on the pipe (18). A first conical tensioning face (22) which cooperates with the first conical bore (5) is on the connecting portion (21). The first conical tensioning face defines a third cone angle (23) which is greater than the first cone angle (11) and whose axial length of overlap (32) with the first conical bore (5) is smaller than 15% of the axial bore length (9) of the first conical bore (5). The connecting portion (21) has a second conical tensioning face (25) which cooperates with the second conical bore (15). The second conical tensioning face defines a fourth cone angle (26) corresponding to the second cone angle (16). On the radial inside of the first tensioning face (22), an annular recess (28) is arranged. The recess (28) starts from the smallest cone diameter (24) of the first tensioning face (22) and extends over part of the axial length.

12 Claims, 3 Drawing Sheets

PIPE CONNECTION WITH A CONNECTING PORTION FORMED ONTO THE PIPE

CROSS-REFERENCE TO RELATED APPLICATION

This application is based upon and claims priority to German Patent Application 199 51 460.7 filed Oct. 26, 1999.

BACKGROUND OF THE INVENTION

The invention relates to a pipe connection with a connecting member, a nut and a pipe having a formed-on connecting portion. The pipe is clamped in between the nut and the connecting member.

DE 195 11 063 A1 describes a pipe connection where the connecting portion is clamped between the conical bore of the nut and the conical bore of the connecting member. The members form a first and a second tensioning face. Both tensioning faces are formed in such a way that they rest in a planar way against the conical bore of the connecting member and the conical bore of the nut respectively. Furthermore, an annular contact shoulder is provided to limit the tightening operation. A pipe projection is arranged in front of the first tensioning face cooperating with the conical bore of the nut. The pipe projection, by means of a region of transition, ends in the tensioning face. The remaining annular space is intended to receive a soft seal which, in particular, is to achieve precision sealing.

The length of contact between the first tensioning face of the connecting portion of the pipe associated with the connecting member and the conical bore of the connecting member in the tightened condition extends over a large part of the axial length of the conical bore of the connecting member. If a soft seal is provided, it is possible that the seal may be damaged while the pipe is being slid into the conical bore of the connecting member. Furthermore, the space available for the soft seal is so limited that only a very thin ring can be used which is very sensitive to external influences.

DE 195 20 099 C2 illustrates a pipe connection which also comprises a connecting member with a conical bore as well as a nut. A pipe is clamped between the two by a connecting portion. The connecting portion of the pipe includes a first supporting face which extends substantially radially relative to the longitudinal axis of the connection. The supporting face, in the tightened condition, is axially supported on the end face of the connecting member. Furthermore, the connecting portion includes a tensioning face which is designed to cooperate with and match the conical bore of the nut. A cylindrical pipe portion is arranged in front of the connecting portion. The cylindrical pipe portion starts from the radially extending supporting face and extends into the circular cylindrical bore following the conical bore of the connecting member. A seal is positioned in the annular space between the outer face of the pipe projection, the supporting face of the connecting portion and the conical bore of the connecting portion. The disadvantage of this design is that the connection cannot be used without a soft seal. In addition, when fitting the pipe to the connecting member, the soft seal runs the risk of being damaged.

SUMMARY OF THE INVENTION

It is an object of the present invention to provide a pipe connection with full planar contact. The metallic sealing effect is improved. Also, it is additionally possible to use a soft seal which is less likely to be damaged.

In accordance with the invention, a pipe has a connecting member. The connecting member includes a first end face; a first conical bore starting to taper from the first end face, which defines a first cone angle and an axial bore length; a circular cylindrical bore adjoining the first conical bore; and an outer face having a threaded portion. A nut is included for the pipe connection. The nut includes a threaded bore which matches the threaded portion of the connecting member; a second conical bore following the threaded bore and tapering in a direction opposite to the first conical bore of the connecting member and defining a second cone angle; and a through bore. A pipe is included in the pipe connection. The pipe is guided through the through-bore of the nut. The pipe defines a longitudinal axis and has a cylindrical pipe projection extending into the circular-cylindrical bore of the connecting member. A connecting portion is formed on the pipe. The connecting portion follows the pipe projection and includes a first conical tensioning face cooperating with the first conical bore of the connecting member. The connection portion defines a third cone angle. The third cone angle is greater than the first cone angle of the first conical bore. The axial length of the connecting portion which overlaps with the first conical bore is smaller than 15% of the axial bore length of the first conical bore. The connecting portion includes a second conical tensioning face which co-operates with the second conical bore. The second conical tensioning face defines a fourth cone angle which corresponds to the second cone angle. An annular recess is arranged on the radial inside of the first tensioning face. The annular recess starts from the end positioned in the region of the smallest cone diameter of the first tensioning face and extends over at least part of the axial length.

An advantage of the above arrangement is that as a result of the angular conditions regarding the first cone angle and the third cone angle, an overlap is reached. Thus, metallic contact is ensured even if the conical first tensioning face has a short length. It is also ensured that the connecting member is not subjected to impermissibly high loads due to the annular recess. The first tensioning face is able to deform, at least in a partial region of the length of overlap with the first conical bore of the connecting member. Thus, there is no stress concentration.

In a further advantage, after contact has been established between the radially extending supporting face and the end face of the connecting member, only approximately 30° of a rotational path is required to tighten the system. Furthermore, the advantage relative to the prior art assembly, where only a radially extending supporting face co-operates with the end face of the connecting member, is that it is possible to achieve easy and accurate centering of the connecting portion and of the pipe relative to the connecting member. The annular recess can be used to accommodate a soft seal. The seal is centered and accommodated so as to be protected. In addition, as compared to an assembly where the first conical tensioning face of the connecting portion covers approximately the entire axial length of the conical bore of the connecting member, it is possible to use a seal with a greater volume. As compared to the state of the art assemblies, the metallic seal is improved even if a soft seal is not provided. This is due to the fact that as a result of the angular conditions and the short axial length, it is possible to achieve a relatively high surface pressure which is responsible for a correspondingly adequate sealing effect. Advantageous conditions regarding the surface pressure and the sealing effect are achieved if the smallest cone diameter of the first tensioning face is up to 5.5% smaller than the greatest diameter of the first conical bore.

Furthermore, in order to limit the degree of tightening, which ensures that the load on the connecting member is limited to a particularly advantageous ratio, it is proposed that the connecting portion, following the greatest diameter of the first tensioning face, is provided with an annular shoulder. The shoulder extends radially relative to the longitudinal axis. In this embodiment, the advantageous conditions of the surface pressure can be put into effect in those cases where the greatest cone diameter of the first tensioning face, in the region of transition to the annular shoulder, is between 0.15 mm and 0.5 mm greater than the greatest diameter of the first conical bore of the connecting member. The degree of tightening can also be limited if the end face of the pipe projection comes to rest against a step face of the connecting member.

Advantageous strength and deformation conditions for the part of the first tensioning face which comes into contact with the conical bore of the connecting member and for the portion of the connecting portion positioned underneath can be achieved if the annular recess is delimited by the outer face of the pipe projection and by an annular face which starts from the end with the smallest diameter and which is conically tapered in the direction opposed to that of the first tensioning face with a fifth cone angle. It is particularly advantageous if the fifth cone angle ranges between 100° and 160°, and especially amounts to 130°.

The above design conditions can be particularly advantageously applied to embodiments where the first cone angle is about 24° and the second cone angle is about 90°. These are standardized conditions so that the solution in accordance with the invention can also be advantageously used for standard connections. Advantageous sealing and tightening conditions are achieved if the third cone angle is about 30° to 40°. The fourth cone angle of the second tensioning face, in respect of size, corresponds to the second cone angle and thus preferably amounts to about 90°.

A soft seal is used to increase sealing in those cases where repeat connections are likely to be more frequent. The soft seal fills the annular recess and projects therefrom into the space delimited by the outer face of the pipe projection and by the first conical bore. The soft seal is protectively received in the annular recess. Thus, during assembly procedures, the risk of damage to the seal is considerably reduced. In addition, this embodiment provides a greater volume to receive the seal. In consequence, the seal can be designed to be more robust.

The axial cone length of the first tensioning face is smaller than 15% of the axial length of the first conical bore to achieve the desired length of overlap in an assembly where an annular shoulder delimits the operation of tightening the connecting portion. Thus, the immersion of the first tensioning face into the first conical bore of the connecting member is at a desired depth. A step is provided at a distance from the annular shoulder to facilitate deformation.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawings wherein.

DETAILED DESCRIPTION OF THE PREFERRED EMBODIMENT

Figure 1:
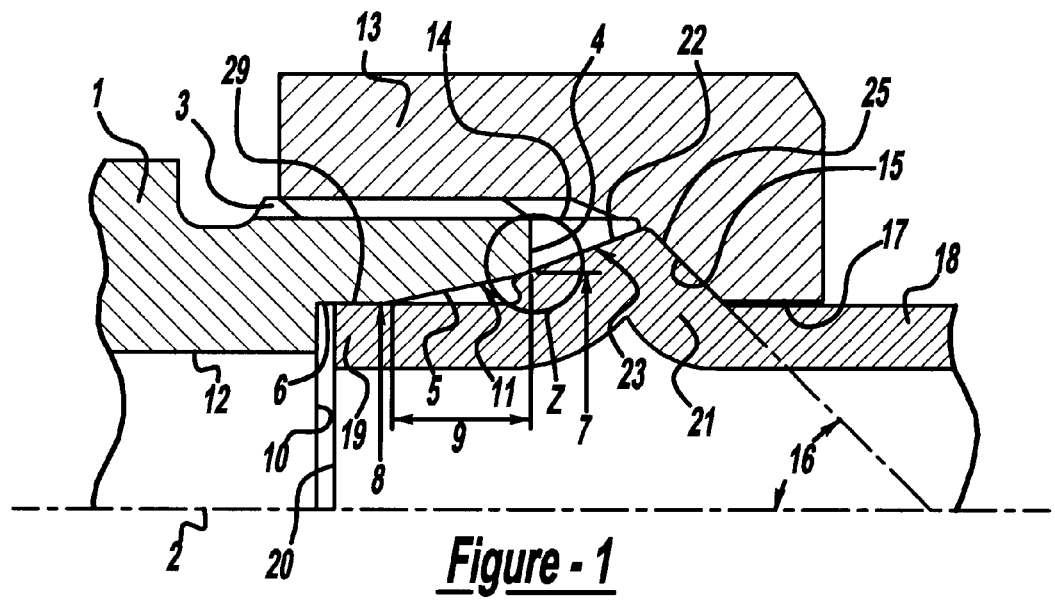
FIG. 1 is a cross-section view of a first embodiment of an inventive pipe connection at the start of assembly.
Figure 2:
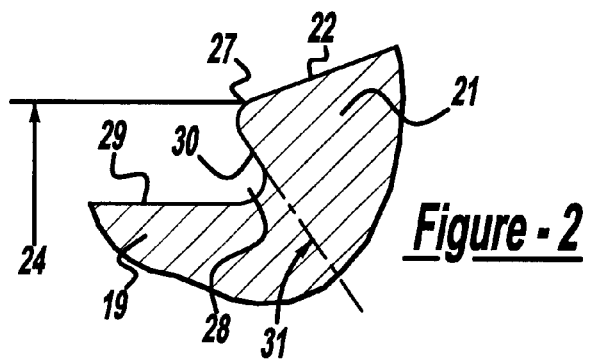
FIG. 2 is an enlarged cross-section view of detail Z according to FIG. 1.

The pipe connection shown in FIGS. 1 and 2 has a connecting member 1 of which only a first portion is shown. The connecting member 1 defines a longitudinal axis 2, which constitutes the longitudinal axis of all components of the connection. A threaded portion 3 is on the outer face of the connecting member 1. The threaded portion 3 starts from the end face 4. The end face 4 is perpendicularly positioned to the longitudinal axis 2.

A first conical bore 5 starts from the end face 4. The conical bore 5 has its greatest diameter in the region of the end face 4. The smallest diameter 8 of the first conical bore 5 is followed by a circular cylindrical bore 6. The first conical bore 5 defines a first cone angle 11 of about 24°. The design of this portion corresponds to the standardized embodiment according to DIN 2353 and ISO 8334 ff, respectively, including the tolerances mentioned therein. The axial length of the first conical bore 5 has been given the reference number 9. The circular cylindrical bore 6 ends in the step face 10 from which there starts a through-bore 12. The through-bore 12 can be used to connect to a bore arrangement for example as described above. Thus, the connecting member 1 may comprise two threaded portions 3. Accordingly, the connecting member 1 would serve to connect two pipes to one another.

A nut 13 with a threaded bore 14 can be threaded onto the threaded portion 3 of the connecting member 1. The nut 13 has a second conical bore 15. The conical bore 15 is tapered away from the first conical bore 5. The second conical bore 15 defines a second cone angle 16, which in a standard embodiment according to DIN 2352 and ISO 8434 ff, respectively, amounts to about 90°. The second conical bore 15 is followed by a through-bore 17.

The tube 18 penetrates the nut 13 in the region of the through-bore 17. The tube 18 has a connecting portion 21. The connecting portion 21 is clamped between the first conical bore 5 and the second conical bore 15. A pipe projection 19 is arranged in front of the connecting portion 21. The pipe projection 19, via its outer face 29, projects into the circular-cylindrical bore 6 of the connecting member 1. Its end face 20, in the untightened condition, is positioned at a distance from the step face 10 as seen in FIG. 1.

On its outside, the connecting portion 21 has a first tensioning face 22.

The tensioning face 22 is conical in shape. The tensioning face 22 starts from the end 27, positioned in the region of transition of the small radius at the point into the first conical tension face 22, and extends as far as a second tensioning face 25. The second tensioning face 25 is also conical in shape. The second tensioning face 25 extends in a direction opposite to that of the first tensioning face 22. The first tensioning face 22 defines a third cone angle 23 which is greater than the first cone angle 11 of the first conical bore 5. The third cone angle is preferably about 35°.

Figure 3:
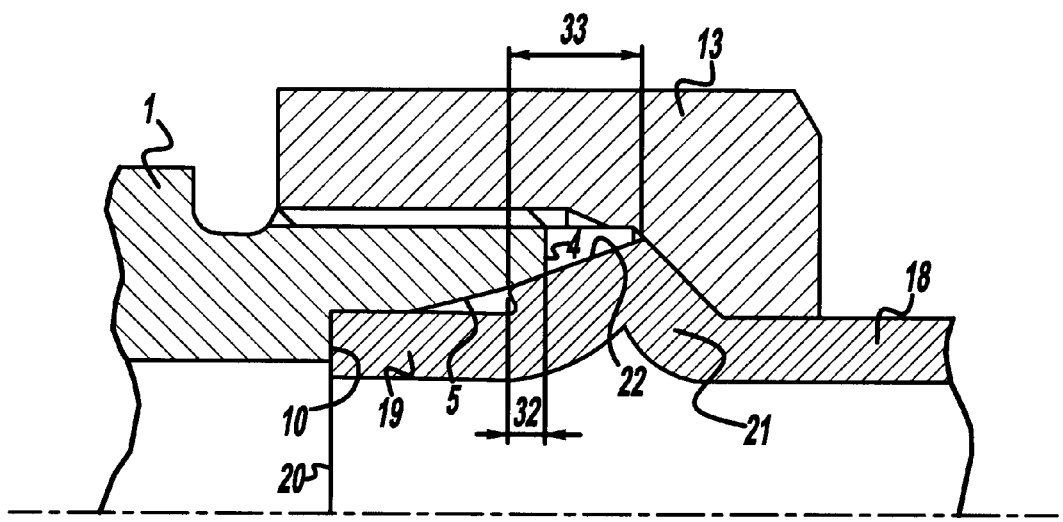
FIG. 3 is a cross-section view of the pipe connection according to FIGS. 1 and 2 in the tightened condition of the connection.

The smallest cone angle 24 of the first tensioning face 22, located in the region of the end 27, has a value which is up to about 5.5% smaller than the greatest diameter 7 of the first conical bore 5. Accordingly, under all conditions, contact exists between the first tensioning face 22 and the first conical bore 5. The contact, in the tightened condition according to FIG. 3, has a length of overlap relative to the axial length 9 of the first conical bore 5. This ensures the necessary degree of sealing and surface pressure, while prohibiting any overloading and impermissible widening or damage to the first conical bore 5 in the region of contact. In the fully tightened condition, the pipe projection 19 is supported by its end face 20 on the supporting face 10 (FIG. 3). It can be seen that the axial length 33 of the first tensioning face 22 is clearly longer than the length of overlap 32. It can also be seen that the length of overlap 32 is clearly shorter than the axial length 9 of the first conical bore 5.

An annular recess 28 starts from end 27 and extends over part of the axial length of the pipe projection 19. The annular recess 28 is delimited by the cylindrical outer face 29 of the pipe projection 19 on the one hand and, on the other hand, by the annular face 30 which starts to taper conically from the end 27. The conical annular face 30 is arranged to define a fifth cone angle 31 of approximately about 130°. Thus, an annular recess 28 is formed. The recess ensures that when the first tensioning face 22 comes into contact with the edge region between the first conical bore 5 and the end face 4, as a result of the selected different angles of the conical faces, an intense metallic contact exists. Deformation may occur at the same time. The deformation prevents any impermissible load on the connecting member 1 in that region. The components, the connecting member 1, the nut 13 and the pipe 18 with the connecting portion 21, are designed to be rotationally symmetric relative to the longitudinal axis 2.

Figure 4:
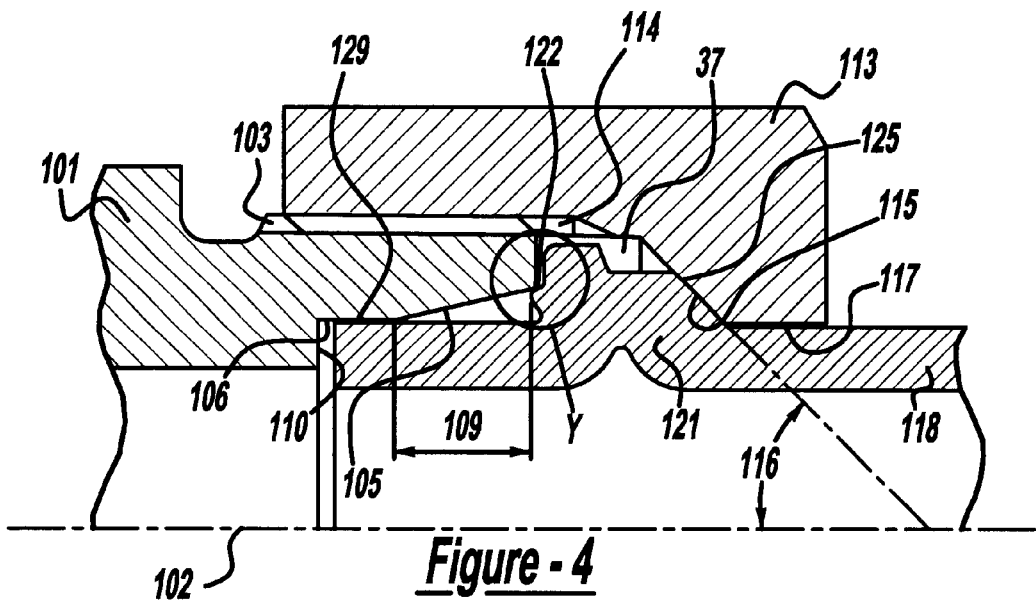
FIG. 4 is a cross-section view of a further embodiment of an inventive pipe connection in a condition prior to the tightening of the nut.
Figure 5:
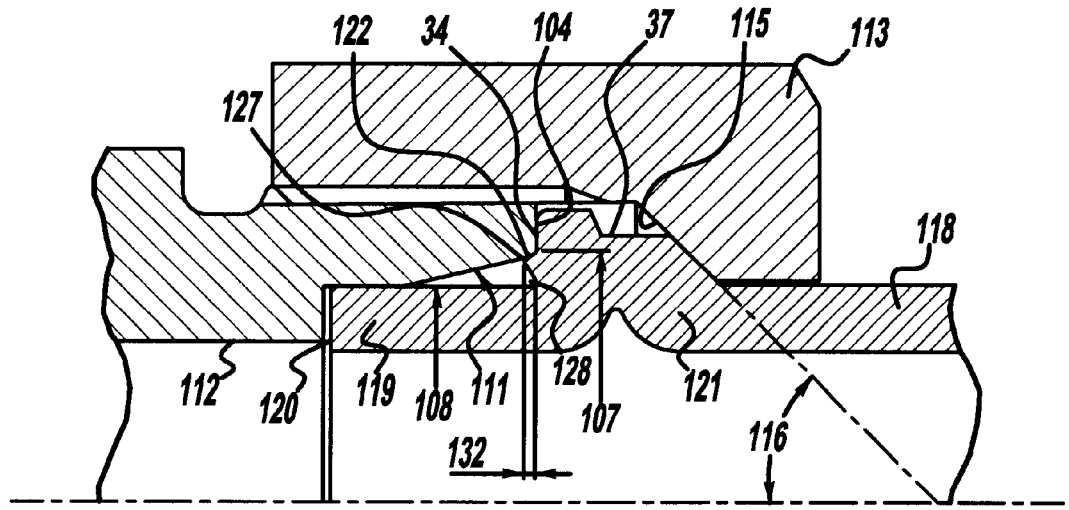
FIG. 5 is a cross-section view of the pipe connection according to FIG. 4 in the fully tightened condition.
Figure 6:
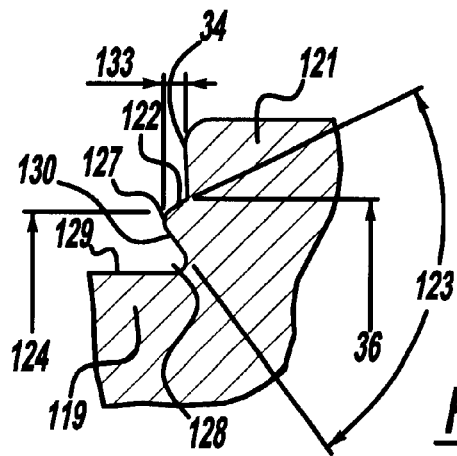
FIG. 6 is an enlarged cross-section of detail Y according to FIG. 4.

FIGS. 4 to 6 show a second embodiment of a pipe connection. The reference numbers of identical parts and designs have been increased by 100 as compared to FIGS. 1 to 3. The connecting member 101 and the nut 113 thus fully correspond to the connecting member 1 and the nut 13 in the embodiment according to FIGS. 1 to 3. A description of the differences, especially as far as detail Y is concerned, is given below.

The connecting portion 121 has a tensioning face 122 with a relatively short axial length 133. The first tensioning face 122 starts from the smallest diameter 124 of the connecting portion 121. The first tensioning face 122 ends in an annular shoulder 34. The shoulder 34 radially extends relative to the longitudinal axis 102. When the nut 113 is fully tightened on the connecting member 101, the shoulder 34 comes to rest against the end face 104. An annular recess is provided to ensure that no damage occurs when a soft seal is used. In consequence, a length of overlap 132 results which is identical with the axial length 133 of the first tensioning face 122.

Figure 7:
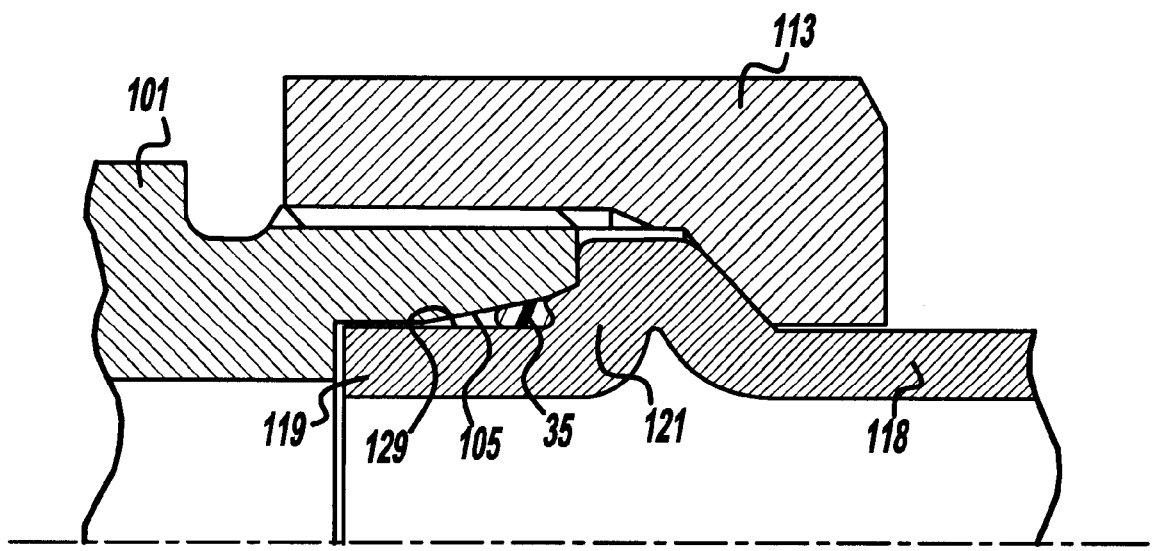
FIG. 7 is a cross-section view of the pipe connection according to FIGS. 4 to 6 in the fully tightened condition with a soft seal.

Furthermore, the relatively short installation length makes available a particularly large free space for accommodating a soft seal, as illustrated in FIG. 7 for example. The soft seal which is produced from plastics or a rubber material for instance, fully fills and projects from the annular recess 128. Thus, the seal is accommodated in the annular space formed by the first conical bore 105 and by the outer face 129 of the pipe projection 119. The seal seals the faces. A soft seal 35 can also be used in embodiments illustrated in FIGS. 1 to 6. If repeat connections are carried out on a frequent basis, the desired sealing effect continues over a long period of time. The angle sizes selected ensure that an increased resistance against the pipe rotating exists during assembly. A further advantage is that, as a result of the design, the tightening path during final assembly can be shortened.

At a distance from the annular shoulder 34, it is advisable to provide a step 37 as illustrated in FIGS. 4 and 5. The step 37 enables the material to be used to specifically form the first tensioning face 122 and, additionally, to reduce deformation work and accelerate the deformation process.

While the above detailed description describes the preferred embodiment of the present invention, the invention is susceptible to modification, variation and alteration without deviating from the scope and fair meaning of the subjoined claims.

What is claimed is:

1. A pipe connection comprising:
    a connecting member having a first end face, a first conical bore starting to taper from the first end face, said first conical bore defining a first cone angle, an axial bore having a desired length in said connecting member, a circular cylindrical bore adjoining the first conical bore in said connecting member, and an outer face of said connecting member having a threaded portion;
    a nut including a threaded bore matching the threaded portion of the connecting member, a second conical bore in said nut following the threaded bore, said second conical bore tapering in a direction opposite to that of the first conical bore of the connecting member, said second conical bore defining a second cone angle, and a through bore through said nut;
    a pipe guided through the through-bore of the nut, said pipe defining a longitudinal axis, a cylindrical pipe projection on said pipe extending into the circular cylindrical bore of the connecting member, a connecting portion formed on said pipe following the pipe projection, said connecting portion including a first conical tensioning face cooperating with the first conical bore of the connecting member, said first conical tensioning face defining a third cone angle, said third cone angle being greater than the first cone angle of the first conical bore, an axial length of overlap of said first tensioning face with the first conical bore is smaller than 15% of the axial bore length of the first conical bore;
    said connecting portion including a second conical tensioning face which cooperates with the second conical bore, said second conical tensioning face defining a fourth cone angle which corresponds to the second cone angle and an annular recess on the radial inside of the first tensioning face, said annular recess starting from an end positioned in the region of the smallest cone diameter of the first tensioning face and said recess extending over at least part of the axial length of said pipe projection.

2. A pipe connection according to claim 1, wherein the smallest cone diameter of the first tensioning face is up to 5.5% smaller than the greatest diameter of the first conical bore.

3. A pipe connection according to claim 1, wherein the connecting portion in the region adjoining the greatest diameter of the first tensioning face includes an annular shoulder extending radially relative to the longitudinal axis.

4. A pipe connection according to claim 1, wherein the end face of the pipe projection is intended to contact a step face of the connecting member.

5. A pipe connection according to claim 1, wherein the annular recess is delimited by the outer face of the pipe projection and by an annular face which starts from the end with the smallest diameter and which is conically tapered in a direction opposite to that of the first tensioning face, said conical taper defining a fifth cone angle.

6. A pipe connection according to claim 5, wherein the fifth cone angle ranges between 100° and 160°, preferably about 130°.

7. A pipe connection according to claim 1, wherein the first cone angle being about 24° and the second cone angle being about 90°.

8. A pipe connection according to claim 1, wherein the third cone angle being from about 30° to about 40°.

9. A pipe connection according to claim 1, wherein the fourth cone angle being about 90°.

10. A pipe connection according to claim 1, wherein a soft seal fills the annular recess and projects therefrom into the space delimited by the outer face of the pipe projection and by the first bore.

11. A pipe connection according to claim 3, wherein the axial cone length of the first tensioning face is smaller than 15% of the axial length of the first conical bore.

12. A pipe connection according to claim 3, wherein a step is provided at a distance from the annular shoulder.

* * * * *